UNITED STATES PATENT OFFICE.

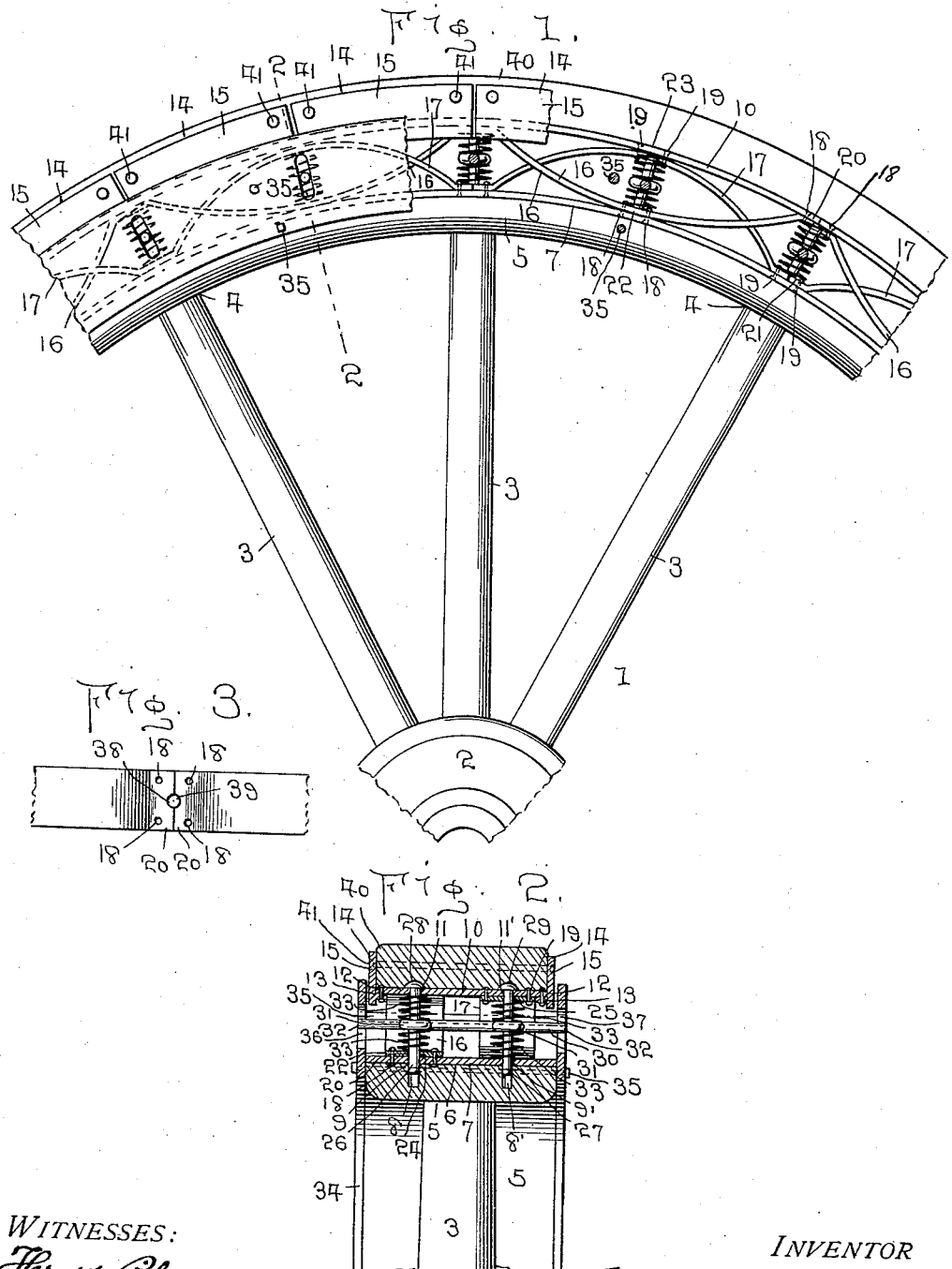

FRANK KLITCHKO, OF CLEVELAND, OHIO.

SPRING-WHEEL.

1,059,616.           Specification of Letters Patent.      Patented Apr. 22, 1913.

Application filed October 3, 1911, Serial No. 652,629. Renewed October 17, 1912. Serial No. 726,402.

*To all whom it may concern:*

Be it known that I, FRANK KLITCHKO, a citizen of the United States, residing at Cleveland, in the county of Cuyahoga and State of Ohio, have invented certain new and useful Improvements in Spring-Wheels, of which the following is a specification.

This invention relates to a new and useful improvement in spring wheels and has for its object the production of a wheel with springs interposed between an outer and an inner ring and arranged so as to take radial and tangential shocks.

The invention consists in the construction hereinafter pointed out.

In the annexed drawings: Figure 1 represents a portion of a wheel containing the invention. Fig. 2, a section on the line 2—2, Fig. 1. Fig. 3, a detail showing ends of flat springs.

In these drawings: the numeral 1 represents a wheel having the hub 2, spokes 3 and, secured to the ends 4 of the spokes 3, a rim 5. These are constructed in any usual way and only so much is shown as is necessary to display the invention therewith.

Around the outer surface 6 of the rim 5, these is placed and secured to this rim 5, a steel band 7. In the rim 5 are sockets 8, 8', in pairs across the rim and alined with the sockets 8 are holes 9, 9', in the band 7. Spaced away from the steel band 7 is a steel elastic rim 10 in which are holes 11, 11', registering with holes 9, 9' and sockets 8, 8'.
To the edges 12 of the steel rim 10 there are fastened on the inside of the rim bottom flanges 13 of sectional casings 14, extending around the wheel and having sectional outer rim flanges 15.
Between the band 7 and the rim 10, there are placed two sets of bowed springs 16 and 17 all around the wheel, the bow of one spring of a set being in the opposite direction to the bow of the other spring in the same set. The bows of the springs in a circumferential line being all in the same direction. These springs 16 and 17 are held by bolts 18 and 19 at their ends 20 and 21 and middle portions 22 and 23. The springs 16 have at their middle portions 22 holes 24 registering with the sockets 8, the sockets 8 holes 9, 24 and 11 being alined. And the springs 17 have holes 25 registering with the holes 11', the sockets 8', holes 9', 25 and 11' being alined. Passing through the holes 11, 24 and 9 and entering the sockets 8 are bolts 26 and passing through the holes 11', 25 and 9' and entering sockets 8' are bolts 27, the heads 28 and 29 of these bolts 26 and 27 being outside of the spring rim 10. Secured to the middle portions of these bolts 26 and 27 are transverse rods 30, welded thereto as shown by the enlargements 31 or otherwise secured. The ends 32 of these rods 30 extend beyond the edges of the band 7 and rim 10. Surrounding the bolts 26 and 27 on each side of the connection between these bolts 26 and 27 and the rod 30 are helical springs 33, there being two to each bolt 26 and 27.

On each side of the wheel there is a casing plate 34 held to the wheel by bolts 35. In the casing plates 34, 34 are radial slots 36 in which are the ends 32 of the rods 30.

Where the ends 20 and 21 of the springs 16 and 17 come together instead of there being a hole such as holes 22 and 25 the holes are formed in halves 38, 39, one in each end of a spring as shown in Fig. 3, where is illustrated the construction of the meeting ends of two springs as 16 of the same set. Outside of the rim 10 and between the sectional casings 14 is secured the rubber tire 40 by transverse bolts 41.

In use the shocks and strains come upon the elastic rim 10 and the springs located between this rim 10 and the band 7 of the helical springs 33 those between the band 7 and the rods 30 assist in absorbing the shocks and strains. The springs 33 between the rods 30 and the rim 10 assist in taking the strains in that these outer springs 33 tend to keep the rods 30 from being forced outwardly toward the rim 10 and the bolts 26 and 27 from being forced against the tire 40. This construction produces an efficient and yet sensitive elastic medium between the body of the vehicle and the road. The several parts of this medium act separately or in unison according to the demands upon them, and the several parts are held in proper location radially and circumferentially though free to be operated as the vehicle is in motion.

Having described the invention, what I claim is:

In a wheel the combination of a rim; a band on the outside of the rim; an elastic rim beyond the band; bowed springs arranged around the wheel between the band and the elastic rim, the rim having sockets and the band, elastic rim and bowed springs having holes alined in sets, at the ends and middle portions of the bowed springs; bolts secured to the elastic rim, located in the holes and sockets and slidable in the sockets; rods secured to such bolts, helical springs surrounding the bolts on each side of the rods and casing plates on the sides of the wheel having slots in which are the ends of the rods.

In testimony whereof I affix my signature in presence of two witnesses.

FRANK KLITCHKO.

Witnesses:
 M. E. RUSSELL,
 M. C. HAMMEL.

Copies of this patent may be obtained for five cents each, by addressing the "Commissioner of Patents, Washington, D. C."